Jan. 22, 1957 M. L. WELSH 2,778,108
ADJUSTABLE GASKET CUTTER
Filed Nov. 15, 1955 2 Sheets-Sheet 1

Milton L. Welsh
INVENTOR.

BY Clarence A. O'Brien
and Harvey B. Jacobson
Attorneys

Jan. 22, 1957  M. L. WELSH  2,778,108
ADJUSTABLE GASKET CUTTER
Filed Nov. 15, 1955  2 Sheets-Sheet 2

Milton L. Welsh
INVENTOR.

BY *Clarence A. O'Brien*
*and Harvey B. Jacobson*
Attorneys

United States Patent Office 2,778,108
Patented Jan. 22, 1957

2,778,108

ADJUSTABLE GASKET CUTTER

Milton L. Welsh, Pattersonville, N. Y.

Application November 15, 1955, Serial No. 546,891

2 Claims. (Cl. 30—300)

This invention relates generally to gasket or washer cutters and is more particularly concerned with a rotary cutter device for cutting the inner and outer diameters of a gasket or for cutting a disk from rubber, neoprene, cork, leather or any other suitable fairly soft gasket material.

A primary object of the invention in conformance with that set forth above is to provide a gasket or washer cutter of the character set forth which includes a support shank securable for rotation in a drill press or any other suitable rotating means and reciprocably supporting a spring-urged support shaft having a lower bearing portion for engagement and retention of a gasket material, said support shaft including a pair of transversely adjustable support arms carrying at opposite end portions thereof a pair of vertically adjustable cutter blades in diametrical alignment with the longitudinal axis of the support shaft.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
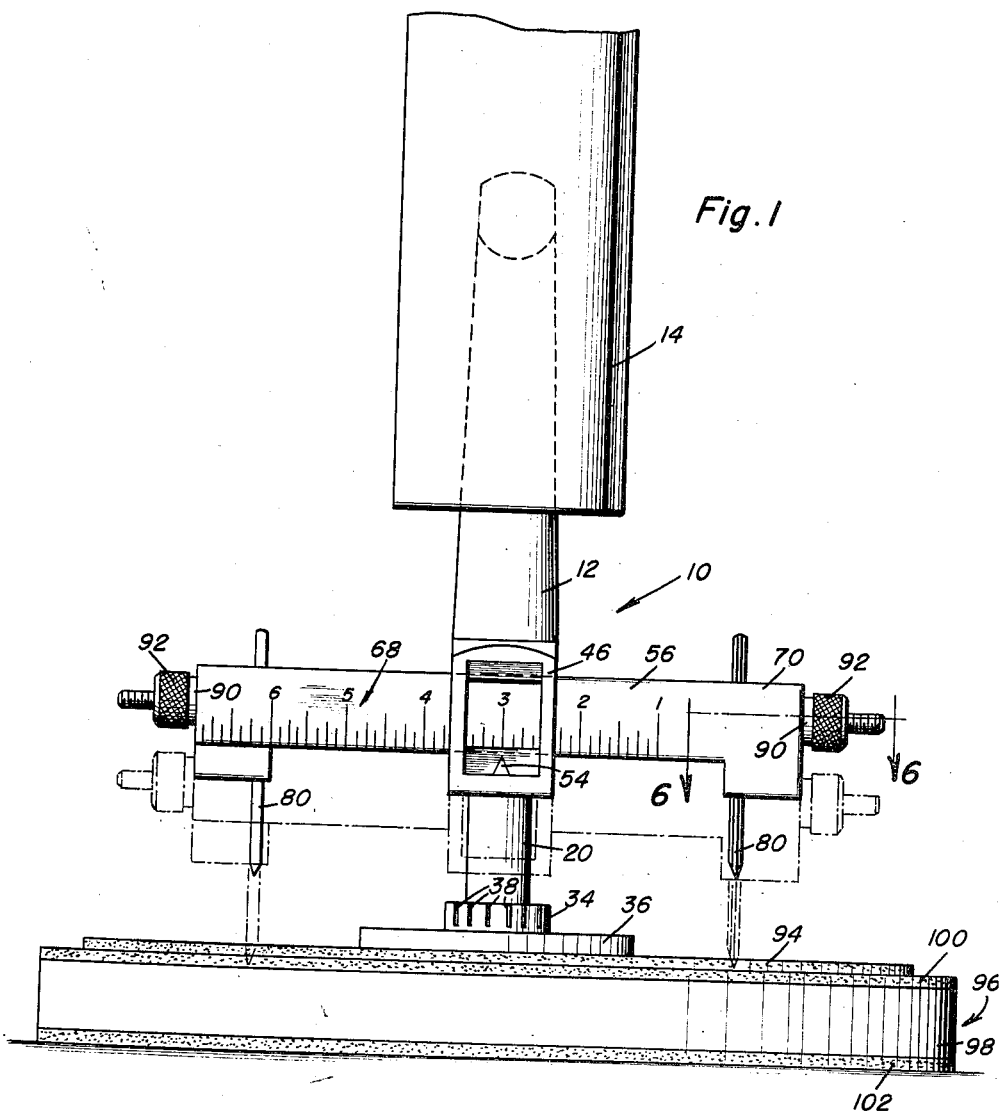
Figure 1 is a side elevational view of the novel gasket cutter showing in phantom lines the relative position thereof after cutting a predetermined size of gasket.

Indicated generally at 10 is the novel gasket cutter which includes a support shank 12 which is removably received in the rotary arbor 14 of a drill press. The support shank 12 includes a blind bore portion 16 opening downwardly and having an inner end wall 18. A support shaft 20 is reciprocably received in the blind bore 16 of the support shank and includes an intermediate longitudinally disposed slot 22 extending therethrough, and a securing pin 24 extending diametrically across a lower end portion of the blind bore 16 is reciprocably received in the slot 22 of the support shaft 20, said pin 24 retaining the support shaft in the blind bore portion 16 and permitting reciprocable movement thereof. A compression spring 26 is disposed in the blind bore portion 16 and includes an end portion in engagement with the upper end 18 of the blind bore portion, the other end of said spring being in engagement with the upper end portion 28 of said support shaft.

The support shaft 20 includes a lower reduced diameter portion 30 which receives thereon a suitable horizontally disposed bearing race 32 which is received in an annular collar portion 34 of a bearing member 36. It will be noted that the annular collar 34 includes a plurality of vertically disposed slots 38 extending circumferentially thereabout which permits support plates 36 of various diameters to be removed and replaced on the bearing 32 depending upon what size disk or washer is being formed by the assembly.

Figure 2:
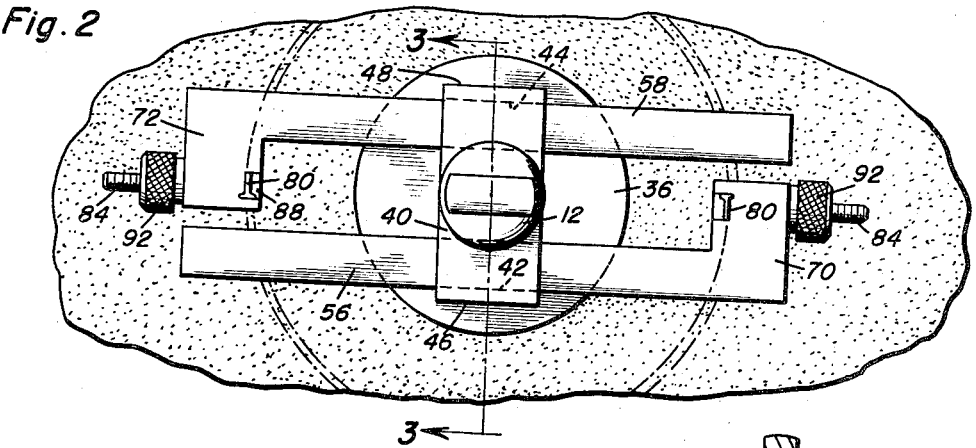
Figure 2 is a top plan view of the novel gasket cutter when removed from a drill press support arbor.
Figure 5:
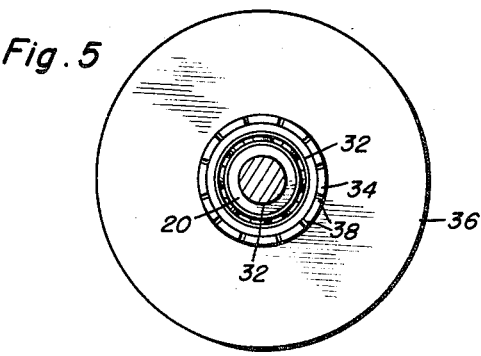
Figure 5 is a sectional view taken substantially on line 5—5 of Figure 4.

The lower end of the support shank 12 terminates in a substantially rectangular enlarged housing portion 40 disposed on opposite sides of the blind bore 16 and including therein a pair of diametrically opposite transverse bore portions 42 and 44. The vertical sides 46 and 48, see Figures 2 and 3, include respective rectangular openings 50 and 52 which open into the respective transverse bore portions 42 and 44 for a purpose to subsequently become apparent. The openings 50 and 52 each include a central upwardly extending pointer portion 54 indicating the longitudinal center of the support shank 12.

Figure 3:
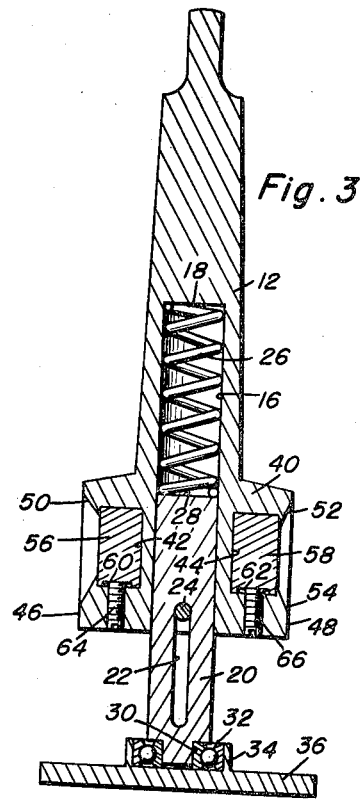
Figure 3 is a sectional view taken substantially on the line 3—3 of Figure 2.

A pair of transversely disposed support arms 56 and 58 are reciprocably received in the respective transverse bore portions 42 and 44, said arms including a lower longitudinally extending groove portion 60 and 62, respectively, which is engageable by a suitable set screw 64 and 66, respectively, see Figure 3, which extends upwardly through the portion 40 of the support shank and into the transverse bore portions 42 and 44 thereof. As seen in Figure 1, the arms 56 and 58 will include indicia of measurement thereon indicated generally at 68 for the purpose of ascertaining the distance from the longitudinal center of the support shank to a downwardly disposed cutter element, to be subsequently described in order to determine the radius of gaskets, washers or disks to be formed by the cutter device.

Figure 6:
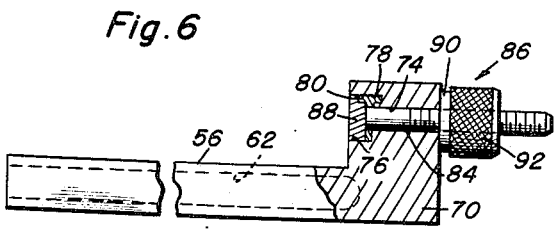
Figure 6 is an enlarged sectional view taken substantially on line 6—6 of Figure 1.
Figure 4:
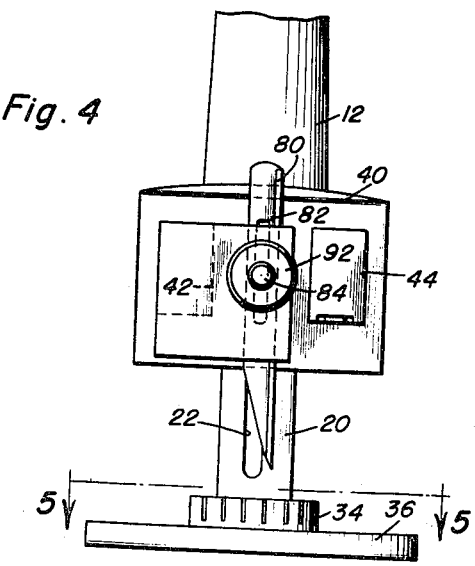
Figure 4 is a fragmentary side elevational view at approximately ninety degrees with respect to that of Figure 1.

Each of the arms 56 and 58, respectively, include an angulated end portion 70 and 72 which are directed toward the opposite support arm, said angulated end portions 70 and 72 each including a transverse bore portion 74 as seen in Figure 6, said transverse bore portion 74 terminating in a vertically extending slot or groove 76 in the angulated ends 70 and 72, this structure only being shown relative to the angulated end 70, said groove 76 including a notched out portion 78 for receiving one side of a T cross-section surgical blade element 80 therein. The blade 80 includes an intermediate longitudinally extending slot 82 therein, see Figure 4, which is adjustably received on the shank 84 of a clamp screw assembly 86, see Figure 6, the shank of said clamp screw including an enlarged end portion 88 conforming to the opposite side of the cutter element 80, the screw extending out of the outer end of the angulated end portions 70 and 72 of the support arms and having circumposed thereon a suitable washer element 90 and fastening nut 92.

The indicia of measurement (graduated in a ½ inch scale) indicates the distance from the cutter element 80 to the longitudinal center of the support shank 12 and thus as indicated in Figure 1 when the arm 56 is set at 3 inches, the diameter to be cut by the cutter element at the right hand side of the figure would be 3 inches. The arm 58 could be removed and thus a 3 inch disc would be cut, or the cutter 80 of the arm 58 may be adjusted 3¼ inches from the longitudinal center of the support shank and thus the outer diameter of the gasket being cut would be 3¼ inches. The member 36 may be of a diameter slightly less than the inside diameter of a disk or washer being cut and will be spring-urged into engagement with the basket material 94, see Figure 1, in order to retain the same in a position to be readily cut by the inner diameter cutting element 80. The cutter element 80 may be vertically adjusted by means of the nuts 92 of the clamp screw assemblies 86 and the one cutting the outer diameter will be slightly higher than the cutter element cutting the inner diameter and thus after the material 94 is completely severed by the cutter element 80 cutting the outer diameter the bearing member 36 will be spring-urged into engagement with the material 94 and will retain the same in a relatively fixed position until the cutter element 80 cutting the inner diameter has penetrated therethrough.

The material 94 may be placed on a suitable support base element 96 of any material and including a center horizontal portion 98 having upper and lower resilient surfaces 100 and 102, respectively, the lower surface 102 retaining the member 96 in a relatively fixed position beneath the drill press arbor, and the upper surface 100 providing a friction surface for retaining the gasket material 94 in a relatively fixed position thereon.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a gasket cutter, a vertical support shank member including a longitudinal downwardly opening blind bore portion, a shaft member reciprocably retained at one end in said blind bore portion, a horizontally disposed bearing assembly on the other end of said shaft member for engagement with material being cut into gaskets, a compression spring element contained in said blind bore portion of said shank member with opposite end portions in engagement between an inner wall portion of the blind bore portion and an upper end portion of said shaft member, said support shank including a pair of diametrically opposite transverse bore portions extending through said shank on opposite sides of the blind bore portion, an arm member reciprocably and adjustably carried in each of said transverse bore portions, each of said arm members including an angulated end portion extending toward the other arm member, and downwardly extending cutter assemblies removably carried in diametrically opposite alignment with the longitudinal axis of the support shank for circumscribing inner and outer diameters of a gasket, the angulated end portions of the arm members including longitudinal bore portions extending therethrough in diametrical alignment with respect to the longitudinal axis of the support shaft member, the bore portions terminating in vertical groove portions in the angulated end portions of said arm members, clamp screws extending through the longitudinal bore portions of said arm members and including at one end enlarged end portions terminating in the vertical groove portions of said arm members, clamp screws including lock nut elements on the end portions extending out of said arm members, the cutter assemblies each including an elongated blade element having an intermediate longitudinal slot portion extending therethrough, each blade being disposed on its respective clamp screw element with the enlarged end portion thereof engageable thereon for retaining each blade in a vertically adjustable position on its respective arm member.

2. In a gasket cutter, a vertical support shank, a shaft member depending out of said shank and having a lower end provided with a member for engaging material to be cut into gaskets, a pair of laterally spaced side-by-side arm members slidably mounted in said support shank at opposite sides thereof for longitudinal adjustment on the support shank, said arm members each including an angulated end portion extending toward the other arm member, and downwardly extending cutter assemblies removably carried by said angulated portions, said angulated end portions including transverse bore portions extending therethrough in diametric alignment with respect to the longitudinal axis of the support shaft member, the bore portions terminating in vertical groove portions in the angulated end portions of said arm members, clamp screws extending through the longitudinal bore portions of said arm members and including at one end enlarged end portions terminating in the vertical groove portions of said arm members, clamp screws including lock nut elements on the end portions extending out of said arm members, the cutter assemblies each including an elongated blade element having an intermediate longitudinal slot portion extending therethrough, each blade element being disposed on its respective clamp screw element with the elongated end portion thereof engageable thereon for retaining each blade in a vertically adjustable position on said arm members.

References Cited in the file of this patent

UNITED STATES PATENTS

| 94,870 | Clark | Sept. 14, 1869 |
| 1,308,650 | Wilson | July 1, 1919 |
| 2,194,409 | Stangohr | Mar. 19, 1940 |
| 2,492,783 | Chamberlain | Dec. 27, 1949 |
| 2,505,236 | Dooley | Apr. 25, 1950 |

FOREIGN PATENTS

| 273,105 | Great Britain | June 30, 1927 |